United States Patent

[11] 3,602,976

| [72] | Inventor | William L. Grube |
| | | Lake Bluff, Ill. |
| [21] | Appl. No. | 857,787 |
| [22] | Filed | Sept. 15, 1969 |
| [45] | Patented | Sept. 7, 1971 |
| [73] | Assignee | MacLean-Fogg Lock Nut Co. |
| | | Mundelein, Ill. |

[54] METHOD FOR CONTROLLING CLAMPING LOAD OF A THREADED FASTENER
13 Claims, 12 Drawing Figs.

[52] U.S. Cl. .................................................... 29/407,
29/413, 29/446, 29/526, 85/61, 151/19
[51] Int. Cl. .................................................. B23q 17/00
[50] Field of Search ............................................. 29/407,
413, 446, 526; 85/61 X; 151/19 X

[56] References Cited
UNITED STATES PATENTS

| 2,520,259 | 8/1950 | Pummill | 151/19 R |
| 1,380,395 | 6/1921 | Korach | 85/61 |
| 1,457,749 | 6/1923 | Rast | 85/61 |
| 1,623,686 | 4/1927 | Kalthoff | 151/19 R |
| 2,892,226 | 6/1959 | Bradney | 85/61 X |
| 2,984,144 | 5/1961 | Erdmann | 151/19 X |
| 3,201,859 | 8/1965 | Stanley | 29/407 X |
| 3,512,447 | 6/1970 | Vaughn | 85/61 |

*Primary Examiner*—Charlie T. Moon
*Attorney*—Davis, Lucas, Brewer and Brugman

ABSTRACT: A method of controlling or establishing, within close limits, the clamping load exerted on a workpiece or the bolt tension developed in a threaded fastener utilized for the securement of the workpiece, and wherein the construction and arrangement of the fastener parts sense variable fastener and workpiece characteristics in a manner such that compensation for such variable elastic characteristics can be made within close and consistent limits by a relatively fixed and readily repeatable final movement of one of the holding parts of the fastener.

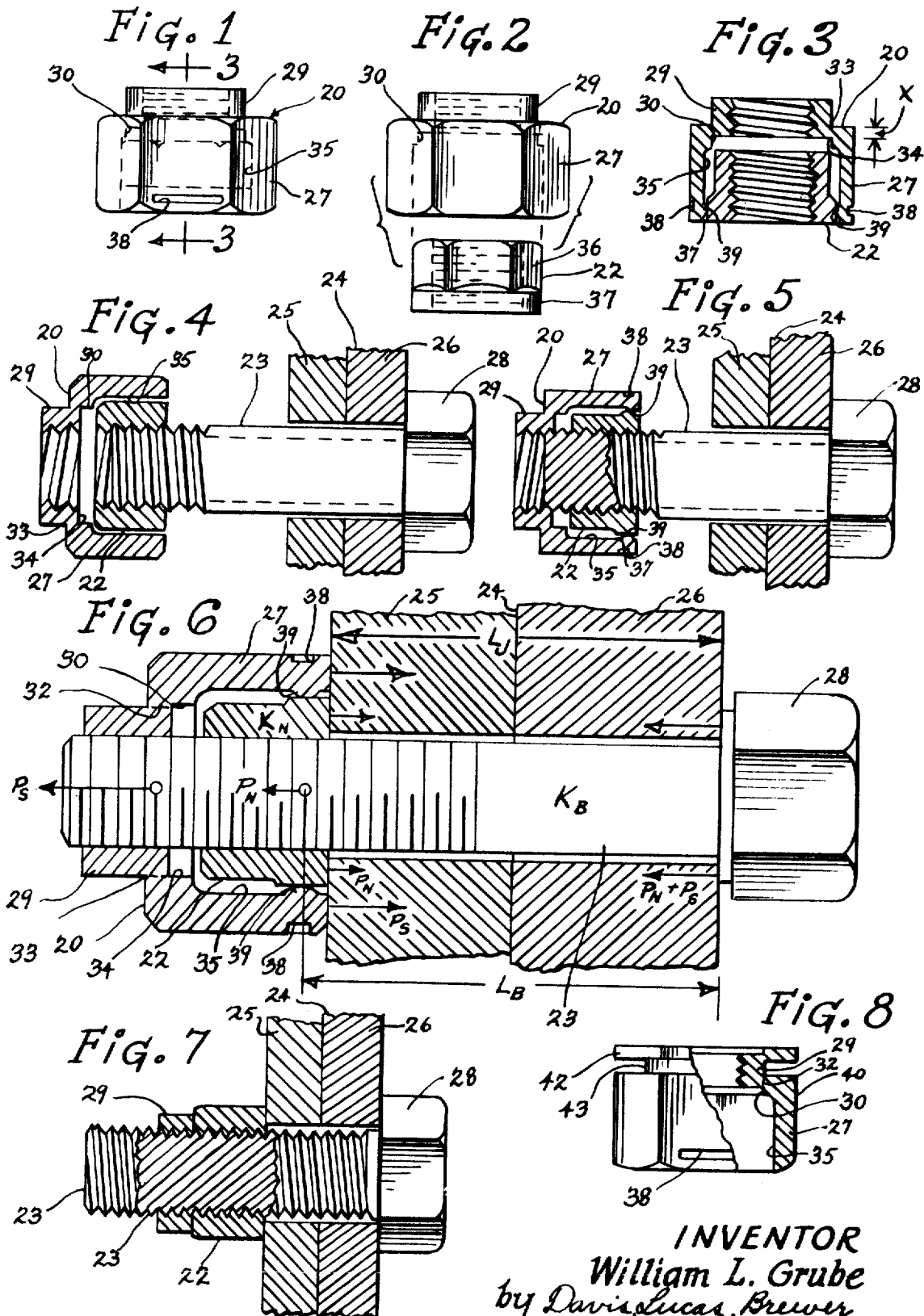

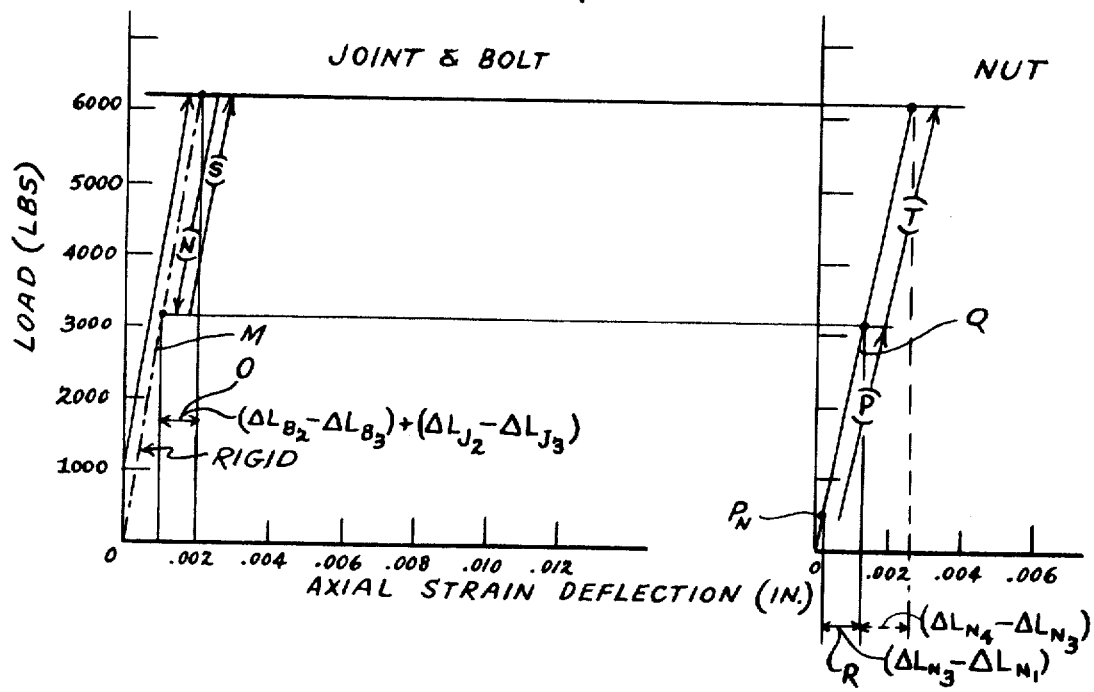
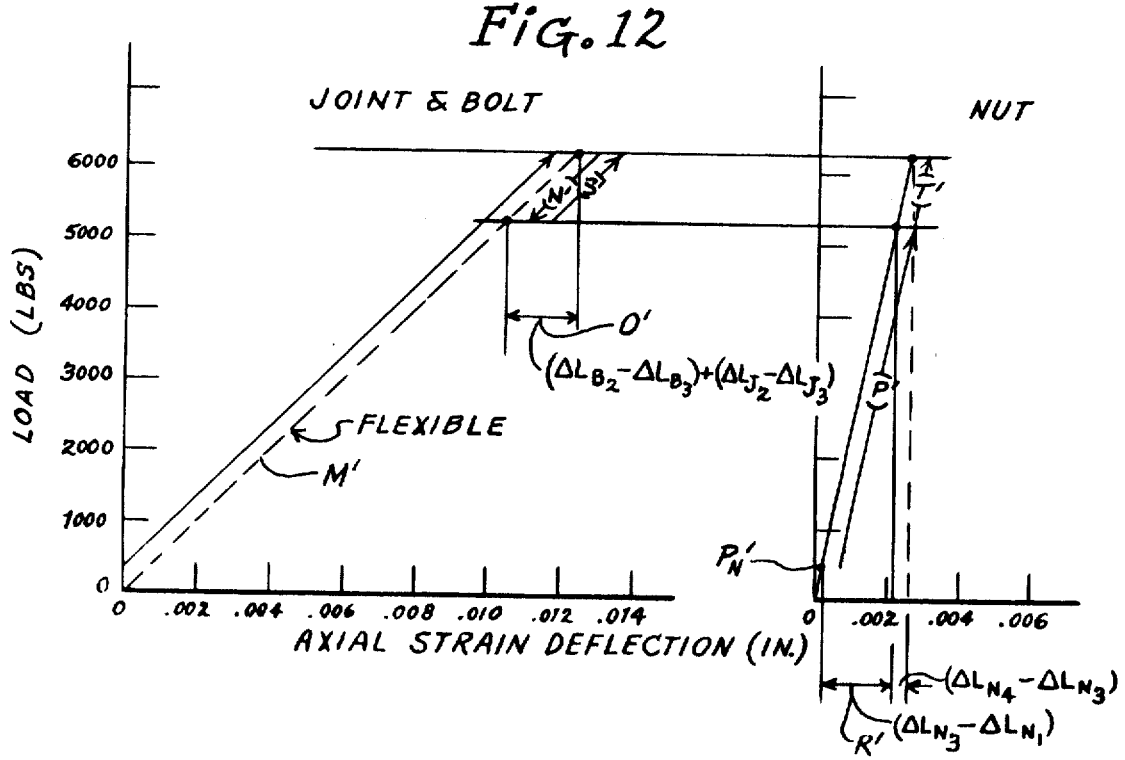

METHOD FOR CONTROLLING CLAMPING LOAD OF A THREADED FASTENER

CROSS-REFERENCE

Fastener structure and method steps disclosed and not claimed herein are disclosed and claimed in my copending application, Ser. No. 791,366, filed Jan. 15, 1969, for Means and Method For Controlling Tension In A Threaded Member.

BACKGROUND OF THE INVENTION

Because of variable factors, including the elastic properties of the workpiece and fastener parts, friction in the threads of a fastener and friction between the workpiece and fastener parts, which variable factors cannot be effectively sensed in any known method of regulating, controlling, limiting or establishing clamping force or bolt tension by the measurement of torque applied to a threaded fastener part, that method, although widely used, is very inaccurate, even in production applications in which like parts are involved and utilized. As between different parts wherein different metals and metal finishes and different part thicknesses and bolt lengths are involved as variables, the dependence upon torque applied to a threaded fastener part as a measure of clamping force or bolt tension is even less accurate.

Such factors as the advancement of technology, limitations of weight and material in equipment, and considerations given to dependable operation and safety have brought about demands for greater accuracy and dependability in the loading of threaded fasteners within their safe working limits and the more definite establishment of the clamping forces exerted thereby.

The structure disclosed herein and its basic method of operation which are the subject of my aforementioned copending application, Ser. No. 791,366 are adapted to the attainment of results superior to any previously known for a working combination, and provide a basis for the added and more accurate method disclosed and claimed in this application.

SUMMARY OF THE INVENTION

The invention with which this application is concerned is an outgrowth and refinement of the method disclosed in my aforementioned application, Ser. No. 791,366 and is disclosed in connection with the physical structure shown and described in that application.

One of the objects of this invention is to provide a method for sensing and establishing the ultimate clamping force exerted on a workpiece structure by a threaded fastener or the bolt tension developed in the fastener with greater accuracy and dependability than has heretofore been possible in production-type operations.

As another object, this invention has within its purview the provision of a method of a method of quite accurately predetermining the clamping force exerted by a threaded fastener, so that such fasteners have preselected size and characteristics can be consistently utilized at a safe working load without waste of material and space in the fastener and workpiece to afford reasonable safety and dependability.

This invention also comprehends a method of utilizing a threaded fastener for the exertion of clamping force on a workpiece and in which method major factors of variation are sensed and compensated for, so that the final tightening of the fastener to produce a clamping force within close limits relative to a predetermined working load for the fastener or workpiece is accomplished by a fixed, readily performed and accurately measurable mechanical operation requiring only a minimum of judgment and skill.

It is further an object of this invention to provide a method for establishing the ultimate working load of a threaded fastener within the safe working load range for the fastener without making it necessary to utilize a fastener having load carrying characteristics in excess of those ultimately to be established in order to avoid overstressing the fastener during the process of arriving at the established ultimate working load.

As another object, this invention has within its purview the provision of a method of establishing a prescribed safe working load on a threaded fastener which is independent of either the frictional or elastic characteristics of the workpiece or bolt, and which is adapted for utilization to take advantage of the full strength capabilities of a bolt.

Other objects and advantages of this invention will be apparent from the following description when considered in conjunction with the accompanying drawings.

DESCRIPTION OF DISCLOSED PHYSICAL STRUCTURE

FIGS. 1 to 8 inclusive are structural, and depict forms of structure which are adapted to use for carrying out the method herein disclosed. FIGS. 1 to 3 inclusive, and 8 are illustrative of structural forms and details, while FIGS. 4, 5 and 7 are directed to phases of use and positions of parts which are attendant with the use of the illustrated structure in accordance with the method. FIG. 6 is structural, but is illustrative of various forces characteristics and dimensions which are considered and taken into account in the analysis of the operation of the structure in connection with the disclosed method.

FIG. 1 is a side elevational view of a double-nut structure which is adapted to use in carrying out the method herein disclosed;

FIG. 2 is an exploded view showing the parts of the double-nut which is shown in its assembled relationship in FIG. 1;

FIG. 3 is a side sectional view taken substantially as indicated by a line 3—3 and accompanying arrows in FIG. 1;

FIGS. 4, 5 and 7 are side views, with parts shown in section, which illustrate different positions of parts in the assembly of the two-part nut of FIG. 1 with a mating bolt and a simulated workpiece;

FIG. 6 is a side sectional view drawn to a larger scale than FIGS. 4, 5 and 7 and which in addition to showing a further step in the assembly of the two-part nut with mating bolt and a workpiece, also depicts forces and dimensions which are subject to consideration in connection with the disclosed method;

FIG. 8 is a side view, partially in section, which is illustrative of a modification of one part of the nut structure of FIG. 1;

FIGS. 9, 10, 11 and 12 are illustrative curves showing fastener characteristics which are pertinent to the consideration of the various steps of the method herein disclosed.

Figure 10:
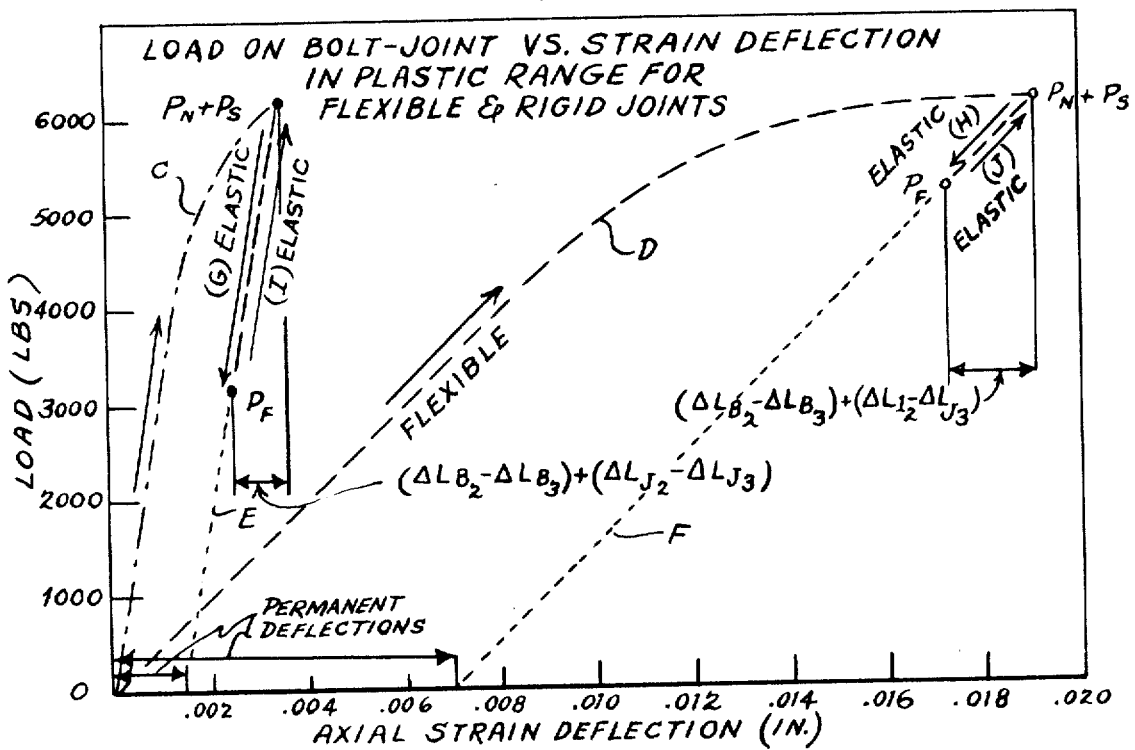

As a brief preliminary summary of certain phases of the structure and operation of the double nut and associated bolt and workpiece which are depicted in FIGS. 1 to 7 inclusive, the double nut includes a threaded-tensioning device or outer nut 20 within which an inner nut 22 is rotatably mounted with frictional engagement between the two nuts. In use, the inner nut is threaded onto a bolt 23, as shown in FIG. 4, which bolt, after being threaded through the inner nut, also engages coaxial threads of the outer nut, as shown in FIG. 5. Upon being tightened against a workpiece 24, which, in the present instance, includes plates 25 and 26 which are to be secured together by the fastener, a skirt portion 27 of the outer nut engages one surface of the workpiece in opposed relationship to a head 28 on the bolt 23 to force the plates of the workpiece into engagement and to develop tension in the bolt. At the same time, the frictional engagement between the outer nut and inner nut keeps the inner nut in firm contact with the workpiece, although, at this stage of the operation, the outer nut is the main tension developing element in its coaction with the bolt. Upon being tightened to a predetermined maximum clamping force or bolt tension, the outer nut ruptures in shear at a selected section of predetermined dimensions to relieve the clamping force of the outer nut and to transfer a portion of that clamping force to the inner nut. As will be explained in greater detail, further tightening of the inner nut 22 by movement thereof through a preselected angle relative to the bolt 23 will return the clamping load and bolt tension to a value within close limits of that developed at the time of rupture of the outer nut.

The outer nut 20, in addition to the skirt portion 27, has a threaded ring portion 29 of cylindrical outer contour which is axially offset from the skirt portion 27 and which, in use, has threaded engagement with the coacting bolt 23. When the outer nut ruptures in shear, as aforementioned the skirt portion 27 and ring portion 29 are severed from one another. Since the driving torque for each nut is applied to the skirt portion 27 and the threads are in the ring portion 29, an operator readily senses the occurrence of the rupture by which a portion of the clamping load exerted by the outer nut is transferred to the inner nut. At this point, the skirt portion 27 of the outer nut may be discarded to expose the inner nut 22, and, if desired, the ring portion 29 of the outer nut may ultimately be tightened into engagement with the adjacent end of the inner nut to serve as a jam nut.

Referring to the structural drawings of FIG. 1 to 7 in greater detail, the outer surface of the skirt portion 27 of the outer nut is polygonal as, for example, hexagonal, to provide symmetrically disposed flat surfaces for the application of a wrench thereto for tightening. Interiorly, the skirt portion 27 of the outer nut has a first counterbore 30 adjacent the inner end of the ring portion 29 and which has a diameter at least equal to the outer diameter of the ring portion 29, and desirably slightly larger than the outer diameter of the ring portion 29, so that the skirt portion and ring portion are connected through a radial segment which provides a circular shear line 32 along which the skirt portion ruptures relative to the ring portion when the critical clamping load or bolt tension is reached by the tightening of the outer nut. It is also noteworthy that corners 33 and 34 at the junctures of surfaces of the ring portion 29 and skirt portion 27 are desirably sharp, so that the thickness of the rupturable section is defined as accurately as possible.

In addition to the counterbore 30, the skirt portion 27 has a second and larger counterbore 35 which extends into the skirt portion a distance greater than the axial length of the inner nut 22, and which is larger in diameter than the inner nut, so that the inner nut is nestable within the skirt portion of the outer nut. As shown in FIG. 2, the inner nut has a substantial axial segment 36 of polygonal shape, such as hexagonal, and which provides flat surfaces thereon for the application of a tool for tightening the inner nut when it is exposed. In addition, the inner nut has a remaining axial segment 37 which has a cylindrical outer surface of a diameter at least as large as the distance between corners formed between the flats of the polygonal segment 36. The inner nut is normally freely rotatable within the counterbore 35 of the skirt portion of the outer nut but has frictional engagement between the cylindrical segment 37 and the skirt portion 27 to provide a prevailing torque which tightens the inner nut against the workpiece surface as the outer nut is tightened against the workpiece and exerts clamping force thereon. In the disclosed structure, the frictional engagement between the cylindrical portion 37 of the inner nut and skirt portion 27 of the outer nut is insured by punching opposed depressions 38 into the outer surface of the outer nut which effect the formation of inner protuberances 39 in alignment for engagement with the cylindrical segment 37 of the inner nut, thereby establishing the desired frictional engagement between the outer and inner nuts and establishing a prevailing torque connection therebetween.

In use, and to avoid the necessity of having the threads of the inner and outer nuts aligned for engagement with the threads of a coacting bolt without relative rotation between inner and outer nuts, the inner nut desirably projects somewhat beyond the workpiece engaging end surface of the outer nut, so that engagement of the inner nut with the workpiece will be ensured, even though some relative movement between the inner and outer nuts is required to attain proper engagement of the threads of the bolt in both nuts with both nuts engaged with the surface of the workpiece. It is also desirable to observe that the magnitude of the force at which the rupture in shear is controlled in respect to the size of the fastener, the safe working load to which it is to be subjected, and the materials involved in the fastener elements is determined by the thickness $x$ of the rupturable portion along the shear line 32, as indicated in FIG. 3.

Various stages of the application of the double nut to a coacting bolt and workpiece in an assembly are depicted in FIGS. 4, 5, 6 and 7. As indicated in FIG. 4, the inner nut is threaded to the end of the bolt in a conventional manner. The threaded engagement continues, with possible orientation of the inner and outer nuts effected by relative rotation therebetween until the bolt threads effectively engage the ring portion 29 of the outer nut, as shown in FIG. 5. This is followed by continued threaded engagement between the inner and outer nuts until clamping force is exerted against the workpiece and tension is developed in the bolt, as illustrated in FIG. 6. Upon the development of the critical clamping force by and through the outer nut and the simultaneous maintenance of seating engagement of the inner nut against the workpiece as a result of the frictional engagement between the nuts, the outer nut ruptures along the shear line 32 to transfer a portion of the clamping force of the outer nut to the inner nut. Because of the effective frictional engagement between the skirt and ring portions of the outer nut, continued rotation of the skirt portion of the outer nut will continue to move the ring portion 29 of the outer nut toward and into engagement with the outer end of the inner nut, as shown in FIG. 7. At this point, the skirt portion of the outer nut may be removed and discarded, thereby exposing the outer surface of the inner nut. As will be more fully explained, the inner nut may be further tightened to produce a clamping force or bolt tension within the safe working limits of the fastener and within close limits relative to a desired and prescribed value.

In the modified form of outer nut 40 illustrated in FIG. 8, the structure thereof is the same as that hereinbefore illustrated and described, except that a polygonal and integral flange 42 is provided on the outer end of the ring portion 29 to afford an axial segment on that ring portion which has flat surfaces aligned with those of the skirt portion 27 for the application of a tightening tool and to facilitate the rotation of the ring portion with the skirt portion and after the skirt portion has become severed from the ring portion by rupture along the shear line 32. In this nut form, the skirt portion 27 is axially segregated from the flange 42 by a peripheral groove 43 having an axial length such that free and complete rupture in shear between the ring portion 29 and the skirt portion 27 is ensured.

As an aid in visualizing the various forces, dimensions and characteristics involved in the following graphical and mathematical analyses of the method herein disclosed, FIG. 6 includes in addition to reference numerals conforming to those embodied in the foregoing description, designations of forces, dimensions and characteristics of pertinent parts which are defined more definitely, as follows:

$K_B$ = the effective spring constant of the bolt 23, wherein deflection is proportional to the load thereon, within the elastic limit thereof;

$K_J$ = the effective spring constant of the workpiece 24 to which the fastener is applied;

$K_N$ = the effective spring constant of the inner nut 22.

$\Delta L_J$ = the change in thickness of the workpiece 24 under the bearing area of the inner nut 22 which results from reactive compressive loading by the inner nut 22;

$\Delta L_B$ = the change in effective length of the bolt 23 which results from active tensile loading;

$\Delta L_N$ = the dimensional change of the inner nut 22 in a direction parallel to the axis of the threads which results from reactive loading from the bolt 23 and workpiece 24; (This quantity must be completely within the elastic range of the inner nut 22.)

$P_N$ = the load imposed on the workpiece 24 and bolt 23 as a result of the prevailing torque applied to the inner nut 22;

(The purpose of this load is to maintain the inner nut 22 in firm contact with the surface of the workpiece and the threads in loaded configuration during the application of external loading to the workpiece 24 and bolt 23. It causes the inner nut 22 to move to "take up" strain developed in the bolt 23 and workpiece 24 by the external loading. The magnitude of this load is small in comparison to the external load (of the order of 10 percent or less), so that large variations in this load will cause only small variations in the total load.)

$P_S$ = the maximum load imposed on the workpiece 24 and bolt 23; (Other means that the disclosed physical embodiment might well be used for the purpose, but the control must be accurate. As herein shown for illustrative purposes, a threaded collar or outer nut 20 is utilized to compress the workpiece 24 to a predetermined load, whereupon an established radial section thereof ruptures in axial shear when the ultimate shear strength for the section and material is reached. The magnitude of this load is predetermined by the selections of the material, thickness and diameter of the rupturable section.)

$P_F$ = the final clamping load which is maintained on the workpiece and reflected by tension in the bolt 23 through the action of the inner nut 22 after the external clamping force of the threaded collar or outer nut 20 has released; (At this point in the operation, the inner nut 22 will be flexed compressively by the forces tending to return the workpiece 24 and bolt 23 to their normal dimensions.)

In connection with the defined factors, it should be understood that even though the actual values of $K_N$, $K_J$, and $K_B$ may be difficult to determine or calculate, the principles herein disclosed rely only upon facts of the existence of such values and that the three elements of the system utilized in the method perform and behave in an elastic manner. It is also worthy of note that even if the workpiece or bolt were deflected into an inelastic range of strain by the loads exerted thereon, it is only necessary for their operation and function in the disclosed method that the materials of which they are fabricated have the property of "elastic springback," as is the case with practically all of the common materials used for the purposes herein considered. In the event of such strain beyond the elastic range, the measures of deflection, ΔL's, would be taken relative to a different reference point than the original dimensions, known as "strain offset" on a stress-strain curve.

GRAPHICAL ANALYSIS

Figure 9:
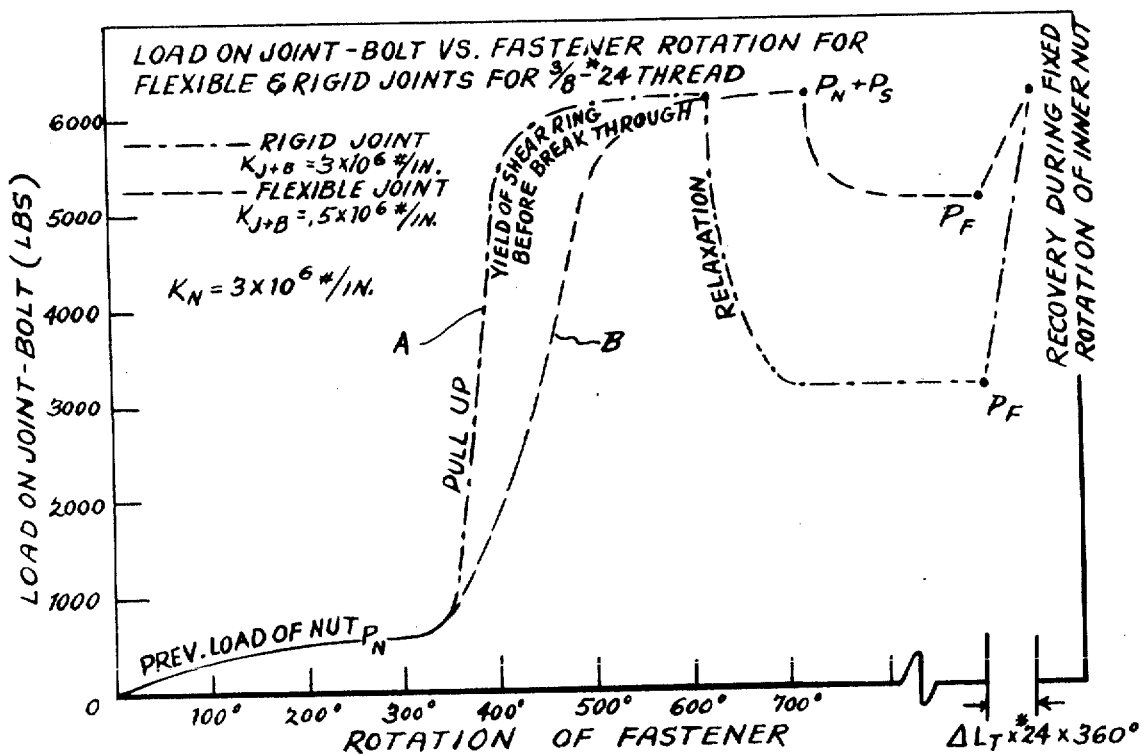

One manner of considering and following the steps of the method herein set forth is with the aid of graphical analysis, as depicted in FIGS. 9 to 12 inclusive. FIG. 9, for example, is illustrative of the variations of the load on the joint or workpiece being fastened and the reflected tension in the bolt as a function of the rotations of the outer and inner nuts relative to the bolt. Two curves, A and B, are presented to show the affects of different joint or workpiece flexibility; curve A being illustrative of a more rigid joint or workpiece than curve B. Comparison of the two curves of FIG. 9 shows that while the tightening of the fastener, the yield of the shear ring and relaxation following the shear are different in magnitude and rate for the two different joints, the same increments of angular movements of the inner nuts after relaxation bring the final exerted clamping force or bolt tension back to a value at which the shear ring of the outer nut broke through. It is of interest to observe, in respect to these curves, that during the time of tightening the fasteners prior to the breakthrough of the shear ring, the slope of the load curve relative to rotation of the nuts is a function of the entire fastener, while during the interval of breakthrough, it is only a function of the elasticity of the joint or workpiece and the bolt.

In FIG. 10, axial strain deflection is plotted in terms of load, and, as in FIG. 9, two curves C and D are illustrative of the application of like fasteners to workpieces or joints of different elasticity. In addition, curves C and D depict conditions in which either the workpiece or joint or the bolt, or both are stressed beyond the yield strength, and that even through this is true, the relaxation and restressing of the fastener and workpiece function within the elastic range of the elements, as shown by dotted lines E and F for curves C and D respectively. For each of the joints of different flexibility or rigidity characteristics shown by the curves C and D, the axial strain deflection builds up beyond the straight line portion and until permanent set takes place as the fastener is tightened. Then, when the breakthrough occurs in the outer nut element of the fastener, the relaxation of strain follows the dotted lines E and F, as indicated at G and H, by virtue of the induced permanent set, rather than falling back along the curves of advance C and D. However, even in this instance, tightening rotation of the inner nut returns the load and strain to the values attained at breakthrough, as indicated at I and J. Thus, it is apparent that the operation of the fastener is not affected by permanent deflection of the joint or bolt or both, as long as the inner nut, by which the final tightening is accomplished, remains within its elastic range of stress.

The curves of FIGS. 11 and 12 are alike, except that the joint or workpiece utilized for the curves of FIG. 11 is more rigid than that utilized in FIG. 12. In both figures, the force acting upon the joint or workpiece and the bolt are separately depicted from those acting upon the inner nut by which the final tightening is accomplished. That is, in FIG. 11, a curve M shows the axial strain deflection of the workpiece or joint and the bolt from zero load to the point of the rupture in shear of the outer nut 20. Upon the occurrence of the rupture of the outer nut, the load on the bolt and workpiece is diminished and also the axial strain deflection thereof, as indicated by the portion N of curve M. The change of axial strain deflection accompanying this transfer of load from the outer nut 20 to the inner nut 22 is represented by a dimensional indicator arrow 0.

As may be readily visualized under the existing circumstances, since the inner nut is firmly seated against the workpiece at the time of the rupture of the outer nut, the change in axial deflection of the bolt and workpiece is transferred to, and compensated for by an axial strain deflection of the inner nut, as represented by a portion P of a curve Q. The increase in axial strain deflection of the inner nut, as between its initial prevailing torque condition and that resulting from the rupture in shear of the outer nut, is indicated in FIG. 11 by the dimensional indicator arrow R. Since a state of equilibrium exists in the fastener and workpiece system both before and after the rupture of the outer nut, and the loss of clamping load by the workpiece and bolt is transferred as an increase to the inner nut, the change in axial strain deflection designated by 0 is equal to that designated as R.

Return of the clamping load on the workpiece to the value at which the outer nut ruptured can be effected by tightening the inner nut beyond the position in which it assumes the load transferred to it by the rupture of the outer nut. For effecting this result, the curve M indicates that such tightening of the inner nut must accomplish the return of the load on the workpiece and bolt and the axial strain deflections thereof to the values at rupture of the outer nut, as indicated by the portion S of the curve M. This tightening of the inner nut effects an equal and opposed load increase on the inner nut which is accompanied by commensurate strain deflection of the inner nut, as indicated by the portion T of the curve Q. As shown in FIG. 9, this requires a fixed and determinable angular movement of the inner nut.

The curves of FIG. 12 are like those of FIG. 11, except that comparison of the two sets of curves indicates the types of value changes encountered as a result of the change from a relatively rigid workpiece, as illustrated in FIG. 11, to a more flexible or less rigid workpiece, as shown in FIG. 12. The designations of the various curves, portions and values are alike in FIGS. 11 and 12, except for the addition of the prime marks in FIG. 12, and the same analysis applies to both. And again, as shown in FIG. 9, whether the workpiece is rigid or more flexible, the reestablishment of the clamping force to the value at which the outer nut ruptures is accomplished by the same angular movement of the inner nut, other factors being the same in both instances.

MATHEMATICAL ANALYSIS

Since the force on the workpiece and bolt, as considered in connection with the disclosed method, is always in equilibrium:

$$P_J = P_B$$

and, since:

force = spring constant $x$ dimensional change due to induced strain, $$\Delta L_J K_J = \Delta L_B K_B$$

where $\Delta L_J$ = the compression of a workpiece resulting from the tightening of a nut on a bolt, and $\Delta L_{B_1}$ = the elongation of the bolt resulting from the tightening of the nut, then: $P_N = \Delta L_{B_1} K_B = \Delta L_{J_1} K_J = \Delta L_{N_1} K_N$ (1)

Where: $\Delta L_{J_2}$ = the compression of a workpiece resulting from the tightening of a nut on a bolt and an additional external force exerted through the bolt, and $\Delta L_{B_2}$ = the elongation of the bolt due to the tightening of the nut and the additional external force acting through the bolt length $L_B$, then: $P_N + P_B = \Delta L_{J_2} K_J = \Delta L_{B_2} K_B$ (2)

and where: $\Delta L_{J_3}$ = the compression of the workpiece after release of the additional external force and $\Delta L_{B_2}$ = the elongation of the bolt after release of the additional external force and $\Delta L_{N_3}$ = the dimensional change of the nut after release of the additional external force due to the reaction of the workpiece and bolt against the nut, then: $P_F = \Delta L_{J_3} K_J = \Delta L_{B_3} K_B = \Delta L_{N_3} K_N$ (3)

It is a quite self-evident fact that any dimensional change in the nut, when the additional external force is released, and equal to the dimension change in the elongation of the bolt plus the accompanying compression of the workpiece, so that:

$$\Delta L_{N_3} - \Delta L_{N_1} = (\Delta L_{J_2} - \Delta L_{J_3}) + (\Delta L_{B_2} - \Delta L_{B_3}) \quad (4)$$

In connection with equation (4), it is to be noted that:

$\Delta L_{J_2} \rangle \Delta L_{J_3}$ and $\Delta L_{B_2} \rangle \Delta L_{B_3}$, but $\Delta L_{N_3} \rangle \Delta L_{N_1}$ The reason for this is that the bolt will be less elongated and the workpiece less compressed after the applied external force is removed, but the nut will be more greatly changed dimensionally as the result thereof.

By transposition of terms of equations (1), (2) and (3), the following relationships are found:

$$\Delta L_{N_3} = \frac{P_F}{K_N} \qquad \Delta L_{N_1} = \frac{P_N}{K_N}$$

$$\Delta L_{J_2} = \frac{P_N + P_B}{K_J} \qquad \Delta L_{J_3} = \frac{P_F}{K_J}$$

$$\Delta L_{B_2} = \frac{P_N + P_B}{K_B} \qquad \Delta L_B = \frac{P_F}{K_B}$$

Substituting these values in equation (4) gives the relationship in terms of loads and spring constants, as follows:

$$\frac{P_F}{K_N} - \frac{P_N}{K_N} = \frac{P_N + P_B}{K_J} - \frac{P_F}{K_J} + \frac{P_N + P_B}{K_B} - \frac{P_F}{K_B}$$

Then, by rearrangement of terms:

$$\frac{P_F}{K_N} + \frac{P_F}{K_J} + \frac{P_F}{K_B} = \frac{P_N + P_B}{K_J} + \frac{P_N + P_B}{K_B} + \frac{P_N}{K_N}$$

Multiplying both sides of the foregoing equation by $(K_B K_J K_N)$ $$P_F(K_J K_B + K_N K_B + K_J K_N) = (P_N + P_B)(K_N K_B + K_J K_N) + P_N K_J K_B$$

By rearranging and solving for $P_F$, this equation becomes:

$$P_F = \frac{P_N(K_N K_B + K_J K_N + K_J K_B) + P_B(K_N K_B + K_J K_N)}{K_N K_B + K_J K_N + K_J K_B}$$

Simplified by cancellation, this becomes:

$$P_F = P_N + P_B \left[ \frac{K_N K_B + K_J K_N}{K_J K_B + K_N K_B + K_J K_N} \right] \quad (5)$$

This equation expresses the relaxation or springback of the three elements in the system when the external force is removed.

From equation (5), it is evident that if $K_J$ and $K_B$ are small in comparison to $K_N$, then the product $K_J K_B$ which appears in the denominator will be very small and will have little effect upon the result. Expressed another way,—if the bolt and workpiece are very elastic in comparison to the nut, the relaxation, when the external load is removed, will be negligable and the securement can be considered as complete. However, when the workpiece is very stiff or nonelastic and the bolt is short and consequently lacks elasticity, the relaxation will be quite considerable, and even though the final load will be predictable and accurate, it will be well below the maximum capabilities and safe working load of the fastener. Thus, a corrective factor is desirable, and, by the disclosed method, is possible and readily practicable.

Analysis of the results at this point indicates that when the workpiece and joint are very flexible, there is only a small amount of relaxation, and that a fixed amount of subsequent tightening rotation of the nut will result in only a relatively small resultant increase in the clamping load on the workpiece or tension in the bolt. On the other hind, if the workpiece and bolt are relatively rigid and nonelastic, a larger amount of relaxation occurs, but a subsequent fixed tightening rotation of the nut produces a relatively large increase in workpiece clamping load or bolt tension. These factors indicated a desirability for further analysis of the dimensional relationships accompanying tightening rotation of the nut after relaxation.

For this purpose, let:

$\Delta L_T$ = the increment of dimensional change produced by tightening rotation of the nut after relaxation.

$\Delta F$ = the increase in clamping force on the workpiece or tension in the bolt which results from the same tightening rotation of the nut after relaxation.

At this point, it should be understood that $\Delta L_T$ is a summation of dimensional changes in all of the three elements of the system, and thus includes increased bolt elongation plus increased workpiece compression plus the axial dimensional change of the nut itself.

Expressed mathematically:

$$\Delta L_T = (\Delta L_{B_4} - \Delta L_{B_3}) + (\Delta L_{J_4} - \Delta L_{J_3}) + (\Delta L_{N_4} - \Delta L_{N_3}) \quad (6)$$

when:

$\Delta L_{B_4}$ = the elongation of the bolt after the fixed increment of tightening rotation of the nut following relaxation.

$\Delta L_{J_4}$ = the compression of the workpiece after the fixed increment of tightening rotation of the nut following relaxation.

$\Delta L_{N_4}$ = the axial dimensional change of the nut after the fixed increment of tightening rotation of the nut following relaxation.

Since the forces on the aforementioned three elements of the system are in equilibrium:

$$\Delta L_{N_4} = \frac{P_4}{K_N}, \Delta L_{J_4} = \frac{P_4}{K_J} \text{ and } \Delta L_{B_4} = \frac{P_4}{K_B}$$

when:

$$P_4 = P_F + \Delta F$$

Also, as previously derived in equations (1), (2) and (3) herein, $$\Delta L_{N_3} = \frac{P_F}{K_N}, \Delta L_{B_3} = \frac{P_F}{K_B} \text{ and } \Delta L_{J_3} = \frac{P_F}{K_J}$$

In order to realize the maximum capabilities of a fastener within its safe load characteristics, it is considered logical and desirable that:

$$P_4 = P_N + P_S$$

It is to be recalled at this point that $P_S$ can have a selected value which is dependent upon the shear section thickness that is built into the disclosed fastener which is adapted to use in this method.

Then, by substitution of the desired working values in equation (6):

$$\Delta L_T = \frac{P_N+P_S}{K_B} - \frac{P_F}{K_B} + \frac{P_N+P_S}{K_J} - \frac{P_F}{K_J} + \frac{P_N+P_S}{K_N} - \frac{P_F}{K_N}$$

By rearrangement and the establishment of a common denominator, this equation becomes:

$$\Delta L_T = \frac{(P_N+P_S-P_F)(K_JK_N+K_NK_B+K_JK_B)}{K_BK_JK_N} \quad (7)$$

Substituting Equation (5) into Equation (7):

$$\Delta L_T = \left[ P_N+P_S-P_N-P_S\left(\frac{K_NK_B+K_JK_N}{K_JK_B+K_NK_B+K_NK_J}\right)\right]$$

$$\Delta L_T = \left[\frac{K_JK_N+K_NK_B+K_JK_B}{K_BK_JK_N}\right]$$

$$\Delta L_T = \left[\frac{P_S(K_JK_B+K_NK_B+K_NK_J)-P_S(K_NK_B+K_JK_N)}{K_JK_B+K_NK_B+K_NK_J}\right]$$

$$\left[\frac{K_JK_N+K_NK_B+K_JK_B}{K_BK_JK_N}\right]$$

$$\Delta L_T = \frac{P_S}{K_N} \quad (8)$$

From equation (8), it may be observed that $\Delta L_T$ (the dimensional change produced by tightening rotation of the nut after relaxation) is completely independent of the elastic characteristics of the workpiece and bolt, and is entirely a function of the shear-through force of the disclosed fastener and the elasticity of the nut. Thus, since both the shear-through force and the nut elasticity are controllable factors which are built into the fastener, it is usable with any workpiece and bolt combination, and the return of the clamping force to the shear-through force value by tightening rotation of the nut can be consistently reached for any workpiece and bolt combination by a predetermined angular movement of a nut having an established value of elasticity.

As a further matter of pertinence and interest, it may be observed that $\Delta L_T$ is readily convertible to nut rotation in angular degrees of movement by:

Rotation in degrees = $\Delta L_T \times$ Threads/inch $\times$ 360 (9)

From the foregoing description and reference to the accompanying drawings, it may be understood that for bolts and nuts of like sizes and characteristics, the method herein disclosed and described provides a repeatable manner of effecting closer control of the clamping force exerted against a workpiece than it has heretofore been possible to accomplish by any known structure or method, and particularly any structure or method which is suited to consistent and repeatable use in production.

I claim:

1. A method of effecting close control of the clamping force exerted against a workpiece by a threaded fastener in which inner and outer nuts having adjacent and radially displaced workpiece engaging surfaces are threaded onto a bolt at positions spaced axially of the bolt with the inner nut relievably driven from the outer nut though a prevailing torque driving connection therebetween so that the inner nut follows tightening movements of the outer nut to maintain contact with the workpiece, and wherein the outer nut has a section rupturable in shear in a direction axial to the nut when substantially a predetermined bolt tension is developed by said tightening of the outer nut against the workpiece, said method comprising, the steps of tightening the outer nut with the inner nut following the tightening movement of the outer nut as a result of said prevailing torque connection until said section of the outer nut ruptures in shear to relieve the clamping force exerted against the workpiece by the outer nut and thereby causes the transfer of a large proportion of the last-mentioned clamping force to said inner nut, and then turning the inner nut through a predetermined angular increment of movement relative to the bolt in a direction to increase the clamping force exerted thereby against the workpiece by a predetermined amount commensurate with the relaxation of the clamping force against the workpiece.

2. A method of effecting close control of the clamping force exerted against a workpiece by a threaded fastener as defined in claim 1, and wherein said predetermined angular increment of movement is a function of the deformation of the inner nut which results from the rupture of the outer nut.

3. A method of effecting close control of the clamping force exerted against a workpiece by a threaded fastener as defined in claim 1, and wherein said predetermined angular increment of movement in degrees is equal to the amount of deformation of the inner nut in prescribed units of linear measure which results from the rupture of the outer nut multiplied by the number of threads on the inner nut per said prescribed unit of linear measure and multiplied by 360.

4. A method of effecting control of the clamping force exerted against a workpiece by a threaded fastener which embodies one threaded fastener element having a portion engaging one surface of a workpiece and a pair of coacting threaded fastener elements which are each threadedly engaged with said one fastener element and are constructed and arranged with a prevailing torque connection therebetween and have portions which simultaneously engage a surface of the workpiece opposed to said one, which method comprises the steps of tightening said pair of fastener elements relative to said one fastener element and against the workpiece by the application of torque to one of the pair while the second of the pair of fastener elements is tightened by virtue of said prevailing torque connection between the fastener elements of the pair, sensing a preselected value of clamping force exerted between the workpiece and said one of the pair of fastener elements, effecting release of the force exerted against the workpiece by said one of the pair of fastener elements without changing the tightened position of the second of the pair of fastener elements relative to said one threaded fastener element when said preselected value of clamping force is reached by said one of the pair of fastener elements to transfer the clamping force exerted on the workpiece to the second of the pair of fastener elements with accompanying force relaxation resulting from said transfer, and then tightening said second of the pair of fastener elements by rotation through a predetermined angle of movement relative to said one fastener element to reestablish the value of clamping force exerted against the workpiece to approximately said sensed value.

5. A method of effecting control of the clamping force exerted against a workpiece by a threaded fastener as defined in claim 4, and wherein said relaxation of clamping force resulting from the transfer thereof from one fastener element of the pair to the other and said tightening of the second fastening element of the pair are functions of the compression characteristics of the second fastener element of the pair.

6. A method of effecting control of the clamping force exerted against a workpiece by a threaded fastener as defined in claim 4, and wherein the sensing of a preselected value of clamping force exerted between the workpiece and said one of the pair of fastener elements is accomplished by rupture in axial shear of a preestablished radial section of said one of the pair of fastener elements.

7. A method of effecting control of the clamping force exerted against a workpiece by a threaded fastener as defined in claim 4, and wherein the release of the force exerted between the workpiece and said one of the pair of fastener elements without changing the tightened position of the second of the pair of fastener elements relative to said one threaded fastener element is accomplished by rupture of a predetermined section of said one of the pair of fastener elements.

8. A method of effecting control of the clamping force exerted against a workpiece by a threaded fastener as defined in claim 4, and wherein said prevailing torque connection by which the second of the pair of fastener elements is driven from said one of the pair of fastener elements is a frictional driving connection which permits relative rotational movement between the fastener elements of the pair at a value of torque applied to the second nut which is less than that applied to said one of the fastening elements of the pair for reaching said preselected value of clamping force.

9. A method of effecting control of the clamping force exerted against a workpiece by a threaded fastener as defined in claim 4, and wherein said prevailing torque connection between the fastener elements of the pair maintains contact of the second fastener element of the pair and the workpiece when said one of the fastener elements of the pair is tightened to said preselected value of clamping force, and said predetermined angle of movement of said second of the pair of fastener elements is proportional to said preselected value of clamping force and inversely proportional to the compression characteristic of the second of the pair of fastener elements.

10. A method of establishing, in a threaded bolt-type fastener, a bolt tension commensurate with the safe load limit of the bolt and fastener by utilizing therewith a pair of concentric nuts having a prevailing torque connection therebetween, as well as adjacent radially separated workpiece engaging surfaces and bolt engaging threads spaced axially of the bolt, which method comprises the steps of turning the outer nut in a tightening direction while the inner nut follows to maintain contact with the workpiece as a result of the prevailing torque connection between the nuts of the pair, tightening the outer nut until a predetermined value of bolt tension measured axially of the bolt in terms of clamping force between the outer nut and workpiece is reached, releasing the clamping force of the outer nut without changing the position of the inner nut in contact with the workpiece to transfer the clamping force to the inner nut with attendant force relaxation, and then tightening the inner nut by turning it through a predetermined angular increment relative to the bolt to reestablish the bolt tension at approximately said predetermined value.

11. A method of establishing a bolt tension commesurate with the safe load limit of the bolt and fastener as defined in claim 10, and wherein said predetermined angular increment of tightening the inner nut to reestablish the bolt tension is a function of said measured value of clamping force and the compression characteristic of the inner nut.

12. A method of establishing a blot tension commensurate with the safe load limit of the bolt and fastener as defined in claim 10, and wherein said predetermined angular increment in degrees to reestablish the tension to approximately said predetermined value is equal to the amount of deformation of the inner nut in prescribed units of linear measure which results from the transfer of the clamping force thereto from the outer nut multiplied by the number of threads on the inner nut per said prescribed unit of linear measure multiplied by 360.

13. A method of effecting close control of the clamping force exerted against a workpiece by a threaded fastener which initially embodies a pair of adjacent threaded fastener elements in adjacent relationship acting against one surface of the workpiece and both coacting with a third threaded fastener element which has opposed engagement with the workpiece, which method comprises the steps of tightening one of the pair of fastener elements relative to the third fastener element and against the workpiece until a predetermined sensed value of clamping force between said one fastener element and the workpiece is reached, turning the other of the pair of fastener elements to bring it into contact with the workpiece while said one of fastener elements is tightened to said predetermined sensed value of clamping force, releasing the clamping force of said one of the fastener elements without changing the position of said other fastener element to transfer the workpiece clamping load to said other fastener element with accompanying relaxation of the clamping force magnitude, and then tightening said other fastener element of the pair against the workpiece by turning through a predetermined angular increment relative to the third fastener element, which angular increment is a function of the compression characteristic of said other fastener element and said predetermined sensed value of clamping force.